(12) United States Patent
Lu et al.

(10) Patent No.: US 10,931,201 B2
(45) Date of Patent: Feb. 23, 2021

(54) DEAD-TIME SUPPLY VOLTAGE COMPENSATION

(71) Applicant: Analog Devices International Unlimited Company, Limerick (IE)

(72) Inventors: Danzhu Lu, Shanghai (CN); Langyuan Wang, Shanghai (CN); Jie He, Shanghai (CN)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/267,269

(22) Filed: Feb. 4, 2019

(65) Prior Publication Data

US 2020/0251987 A1    Aug. 6, 2020

(51) Int. Cl.
   *H02M 3/00*    (2006.01)
   *H02M 3/158*   (2006.01)

(52) U.S. Cl.
   CPC ....... *H02M 3/1588* (2013.01); *H02M 3/1584* (2013.01)

(58) Field of Classification Search
   CPC ..... H02M 3/1588; H02M 3/1584; H03K 5/14
   See application file for complete search history.

(56) References Cited

U.S. PATENT DOCUMENTS

| 5,808,455 A | 9/1998 | Schwartz et al. |
| 6,903,535 B2 | 6/2005 | Liu et al. |
| 7,002,817 B2 | 2/2006 | Lipcsei |
| 7,034,511 B2 | 4/2006 | Schuellein et al. |
| 7,446,519 B2 | 11/2008 | Low et al. |
| 7,466,116 B2 | 12/2008 | Sato et al. |

(Continued)

FOREIGN PATENT DOCUMENTS

| CN | 102386771 A | 5/2012 |
| CN | 203445787 | 2/2014 |

(Continued)

OTHER PUBLICATIONS

Cheng, Brian, et al., "Choosing the Right Variable Frequency Buck Regulator Control Strategy", Texas Instruments Power Supply Design Seminar (SEM2100—Topic 2), ti.com/psds, (2014), 18 pgs.

(Continued)

*Primary Examiner* — Adolf D Berhane
*Assistant Examiner* — Afework S Demisse
(74) *Attorney, Agent, or Firm* — Schwegman Lundberg & Woessner, P.A.

(57) ABSTRACT

Techniques are provided for providing and maintaining an efficient deadtime for a switching circuit as the input voltage varies. In example, a switching circuit can include a control circuit configured to alternately switch the first switch and the second switch into and out of a low impedance state, and to prevent the first switch and the second switch from shorting the first supply rail with the second supply rail using a dead-time before a transition to the low impedance state of each of the first and second switches. The control circuit can a delay element that includes a compensation delay circuit configured to change in-kind with a change of a voltage difference between a first input supply rail and a second input supply rail of the switching circuit, and to limit a range of the dead-time over a range of the voltage difference.

25 Claims, 7 Drawing Sheets

(56) References Cited

U.S. PATENT DOCUMENTS

| | | | |
|---|---|---|---|
| 7,479,778 B1 | 1/2009 | Broach et al. | |
| 7,615,981 B2 | 11/2009 | Wong et al. | |
| 7,646,185 B2 | 1/2010 | Kim | |
| 8,334,683 B2 | 12/2012 | Huang et al. | |
| 8,513,933 B2 | 8/2013 | Notman et al. | |
| 8,541,993 B2 | 9/2013 | Notman et al. | |
| 8,570,011 B2 | 10/2013 | Gritti | |
| 8,587,269 B2 | 11/2013 | Salato | |
| 8,704,505 B2 | 4/2014 | Nakamura | |
| 9,276,477 B2 | 3/2016 | Thomas et al. | |
| 9,276,562 B2 | 3/2016 | Saadat et al. | |
| 9,325,233 B2 | 4/2016 | Bennett et al. | |
| 9,716,435 B2 | 7/2017 | Radhakrishnan et al. | |
| 2005/0088212 A1 | 4/2005 | Leith et al. | |
| 2011/0187189 A1 | 8/2011 | Moussaoui et al. | |
| 2012/0032660 A1 | 2/2012 | Nakamura | |
| 2013/0033248 A1 | 2/2013 | Granger | |
| 2013/0141069 A1 | 6/2013 | Li | |
| 2013/0193941 A1 | 8/2013 | Defazio | |
| 2013/0194003 A1* | 8/2013 | Takayama | H03K 19/0013 326/83 |
| 2014/0266123 A1 | 9/2014 | Rader | |

FOREIGN PATENT DOCUMENTS

| | | |
|---|---|---|
| JP | 10225105 A | 8/1998 |
| JP | 2012070589 A | 4/2012 |

OTHER PUBLICATIONS

Richtek, "Buck Converter Selection Guide", URL: https://www.richtek.com/Design%20Support/Technical%20Document/SG011, (accessed Aug. 3, 2018), 5 pgs.

Sabut, Marc, "Switched Mode Power Supply (DC/DC buck converter)", STMicroelectronics, URL: https://indico.in2p3.fr/event/14305/contributions/17779/attachments/14706/18026/Sabut_SMPS.pdf, (accessed Aug. 3, 2018), 47 pgs.

Texas Instruments, "TPS54122-Q1 Dual-Output, 3-A, QuietSupply(TM) with Integrated DC-DC Converter with Low-Noise LDO", Texas Instruments Product Data Sheet, (Jan. 2015), 40 pgs.

* cited by examiner

US 10,931,201 B2

DEAD-TIME SUPPLY VOLTAGE COMPENSATION

TECHNICAL FIELD OF THE DISCLOSURE

The present disclosure relates to switching circuits, and more particularly, to dead-time compensation for switching circuits susceptible to voltage supply variations.

BACKGROUND

Switching circuits, such as switching circuits for voltage converters, can include switches couples in series between a first supply rail and a second supply rail. For efficiency, it is often desirable to enable (e.g., placed in a low-impedance state) one of the switches as soon as possible after the other switch has been disabled (e.g., placed in a high-impedance state). However, if enabled simultaneously, the switches can short a first supply rail to a second supply rail. Such situations can arise when delays of the control circuit, switch drivers, or the switches change. Such changes in delay characteristics can occur to wear, temperature change, process differences, supply voltages, etc. To prevent such situations, control circuits for the switches can implement a dead-time before a transition of a switch to a low-impedance state. For switching circuits susceptible to supply voltage variations, the deadtime is typically set to compensate for the worst-case scenario for supply voltage dependent delay variations. As such, during more ideal supply voltage scenarios, the worst-case supply voltage dead-time can negatively affect efficiency. Conventional techniques to compensate for supply voltage dependent delay variation employ analytical techniques that include complicated circuits to measure various aspects of the switching circuit, analyze the measurement information, and enable or disable delay elements added to the switching circuit.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
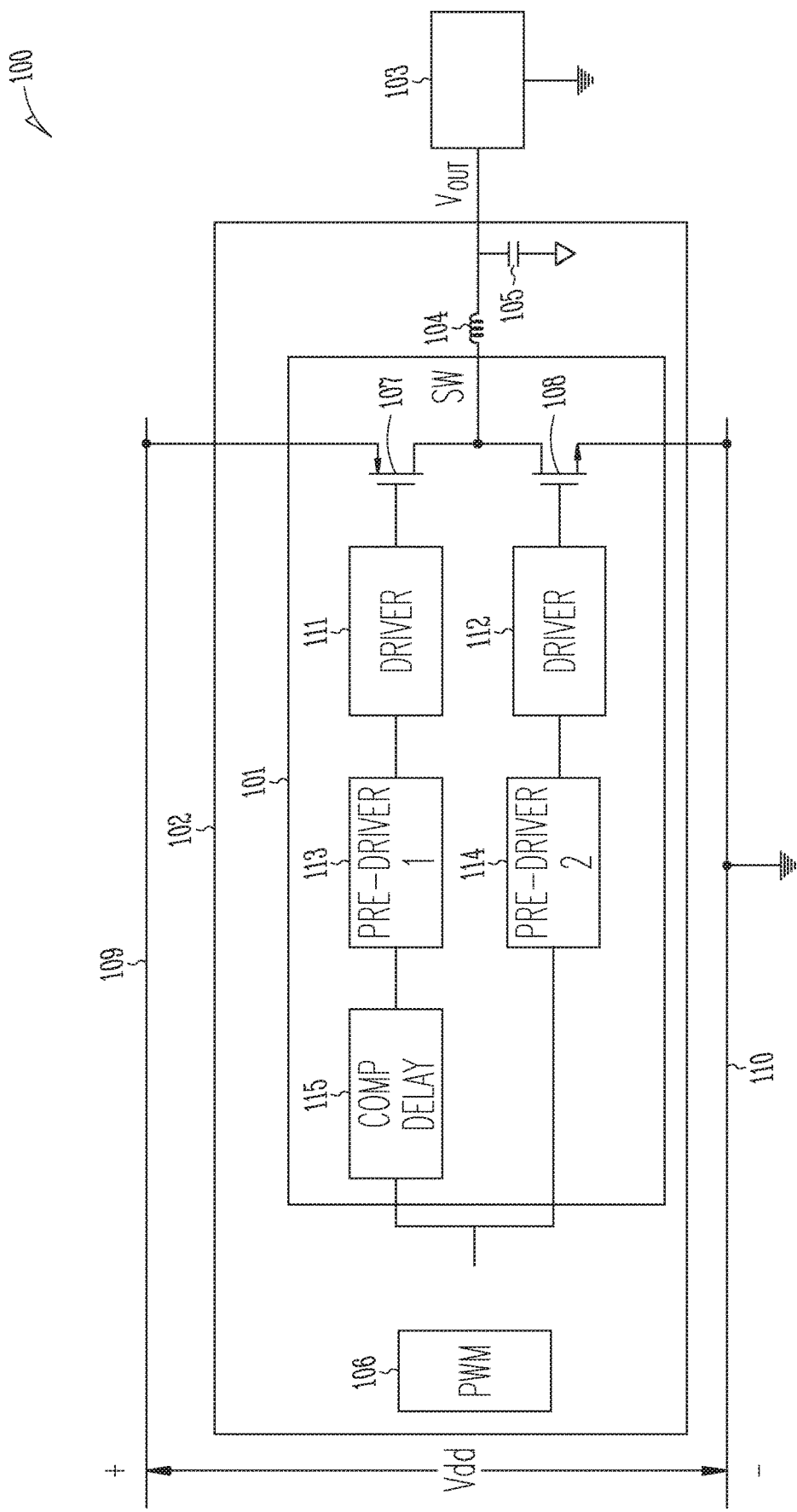
FIG. 1 illustrates an example switch circuit including a compensation delay circuit.

The present inventors have recognized non-analytical circuitry for compensating for temperature dependent delay changes of a switching circuit such that a nearly constant deadtime can be maintained when the supply voltage varies over a wide range of supply voltages. FIG. 1 illustrates generally a voltage converter system 100 including an example switching circuit 101 according to the present subject matter. The voltage converter system 100 can include a voltage converter 102 including the example switching circuit 101 and a load 103. The voltage converter 101 can include an inductor 104 and an output capacitor 105. The voltage converter 101 can receive a first supply voltage (Vdd) and can provide a second supply voltage ($V_{OUT}$) to the load 103. In certain examples, the first supply voltage (Vdd) is at a different voltage level than the second supply voltage ($V_{OUT}$).

The switching circuit 101 can include a controller 106, a first switch 107 and a second switch 108. In the example switching circuit 101, the first switch 107 and the second switch 108 are coupled in series between a first supply rail 109 and a second supply rail 110 providing the first supply voltage (Vdd). The switching circuit 101 can regulate the second voltage ($V_{OUT}$) by controlling current of the inductor 104. In certain scenarios, the control circuit 106 controls the inductor current by alternately switching the states of the first switch 107 and the second switch 108. It is understood that although the switching circuit 101 and the alternating control of the switching circuit 101 is shown in the context of a voltage converter, similar switching circuits and alternating control can be implemented in other contexts such as, but not limited to, synchronous rectifiers, inverters, etc.

The switching circuit 101 can include a driver 111, 112 for each switch 107, 108 and pre-driver circuitry 113, 114, 115 including a first pre-driver circuit 113 for the first switch 107, a second pre-driver circuit 114 for the second switch 108 and a compensation circuit 115. The controller 106 can provide a binary signal such as a pulse-width modulated (PWM) signal and the switching circuit 101 can control the switches 107, 108 in an alternating fashion using the transitions of the PWM signal. When the PWM signal transitions, there can be a delay between the transition of the PWM signal and a corresponding transition of each switch 107, 108. Part of the delay can be associated with a difference in response between the first switch 107 and the second switch 108. In some situations, if the difference in response between the first switch 107 and the second switch 108 is not taken under consideration, the difference in response can cause both the first switch 107 and the second switch 108 to be in a low-impedance state at the same time. Having both the first switch 107 and the second switch 108 in a low-impedance state at the same time can short-circuit the first power rail 109 with the second power rail 110 and can, among other things, damage the switches 107, 108. To prevent shorting the power rails 109, 110 of the converter system 100 together at transitions of the first and second switches 107, 108, pre-driver circuits can provide a delay to create a dead-time between when one switch is commanded to exit a low-impedance, and when the other switch is commanded to enter a low-impedance state.

In conventional techniques, a first pre-driver circuit for the first switch can receive the PWM signal and provide an output signal to the driver circuit for the first switch and to the second pre-driver for the second switch. The second pre-driver can provide an output for the driver of the second switch. In such an example, a first delay (dS1) from the reception of the PWM signal at the first pre-driver to the first switch can be given by, $$dS1 = dpd1 + dd1, \qquad \text{(Eq. 1)}$$

where dpd1 is the propagation delay of the first pre-driver and dd1 is the propagation delay and response of the driver of the first switch.

Likewise, a second delay (dS2) from the reception of the PWM signal at the first pre-driver to the second switch can be given by, $$dS2=dpd1+dpd2+dd2,$$

where dpd2 is the propagation delay of the second pre-driver and dd2 is the propagation delay and response of the driver of the second switch. Subtracting Eq. 1 from Eq. 2 gives the dead-time (DT) interval of a conventional switching circuit, $$DT=dpd2+(dd2-dd1),$$

In practice, the dead-time is most efficient when it is kept as small as possible without risking a short between the power rails. Short dead-times reduce operation of the converter with a conducting body diode. However, propagation delays of pre-driver circuits, as well as, the propagation delay and response of the converter switches vary with supply voltage. In general, the propagation delays and responses change inversely with changing supply voltage. As such, the dead-time for conventional voltage converters can be quite lengthy when the supply voltage is reduced and can vary significantly over the operating range of acceptable supply voltages.

Referring again to FIG. 1, the example switch circuit 101 can include a compensation delay circuit 115. Also, and in contrast to conventional techniques, the switch circuit 101 can receive the PWM signal at both the second pre-driver 114 and the compensation delay circuit 115. The propagation delay dS2 from the input of the second pre-driver 114 to the second switch 108 can be given by, $$dS2=dpd2+dd2. \quad (Eq.\ 3)$$

The propagation delay (DS1) from the input of the compensation delay circuit 115 to the first switch 107 is can be given by, $$dS1=d3+dpd1+dd1, \quad (Eq.\ 4)$$

where d3 is the delay of the compensation delay circuit 115 and is configured to increase with increasing supply voltage (Vdd) and vice versa. Subtracting Eq. 3 from Eq. 4 can provide an estimate of the deadtime (DT), $$DT=d3-dpd2-dd2+dpd1+dd1. \quad (Eq.\ 5)$$

Rearranging Eq. 5 gives, $$DT=d3+dpd1-dpd2+dd1-dd2. \quad (Eq.\ 6)$$

As discussed above, the pre-driver delays (dpd2, dpd1) and the response delays of the drivers (dd1, dd2) generally shrink with increasing supply voltage and increase with decreasing supply voltage. The present inventors have recognized that by choosing pre-driver components and a differential driver delay providing a desired dead-time at a low supply voltage value while the compensation delay (d3) is relatively small or negligible, the compensation delay (d3) can operate to maintain the desired dead-time as the supply voltage (Vdd) increases and vice versa. Because the delay of switching transistors generally decreases with increasing supply voltage, without the techniques of the present subject matter, presetting a small deadtime delay at a low value of the supply voltage risks allowing the switching circuit to operate with little or no deadtime delay when the supply voltage increases. Operation of a switching circuit with little or no deadtime delay can cause the switching circuit to short the supply rails through the switches of the switching circuit. Even one short interval of shorting the supply rails thru the switches can render the switching circuit inoperable.

Figure 2:
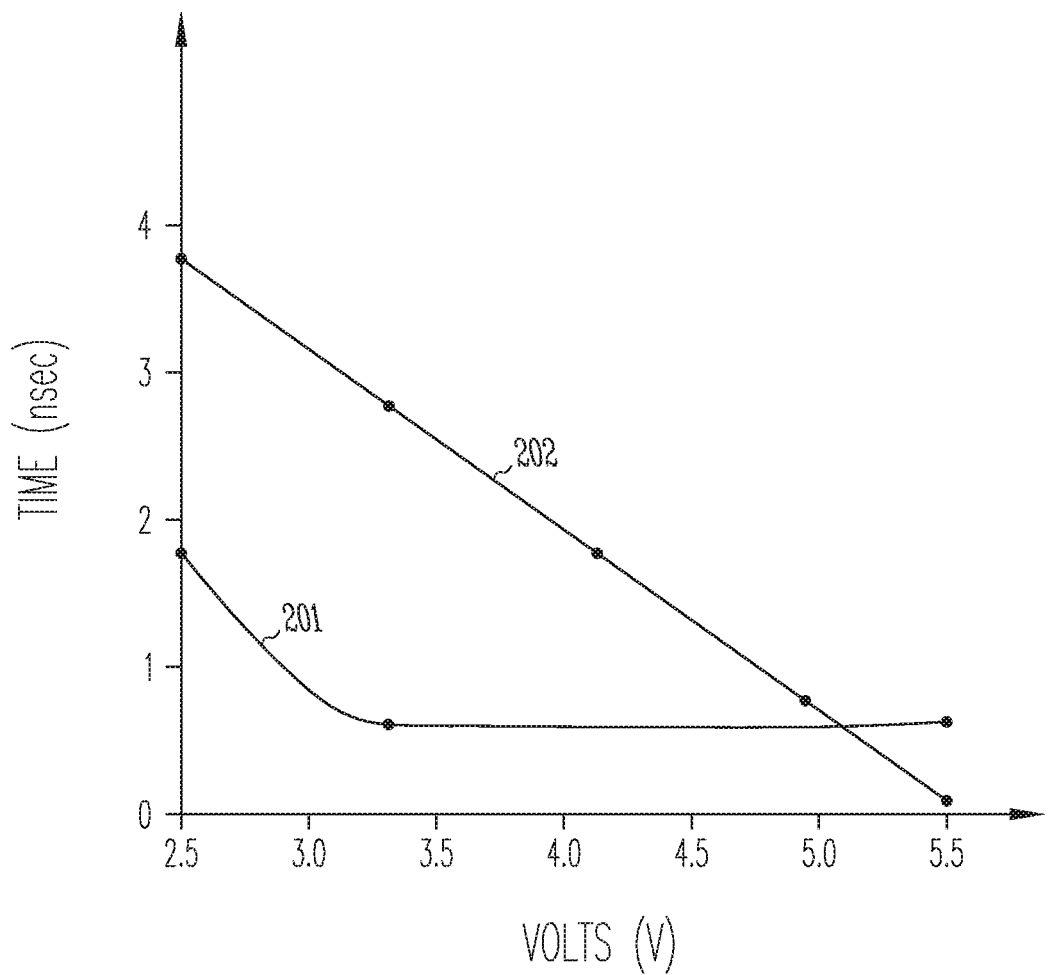
FIG. 2 illustrates graphically the dead-time delay an example circuit the dead-time delay of a conventional circuit.

FIG. 2 illustrates generally the dead-time delay 201 of the example circuit of FIG. 1 and the dead-time delay 202 of a conventional circuit as described by Eq. 2 over a range of supply voltages. A convention circuit can have a dead-time delay of about 4 nsec near the low end of the supply voltage range and about 0.2 nsec near the high end of the supply voltage range. Conversely, the dead-time for the example circuit can have a dead-time of about 1.8 nsec near the low end of the supply voltage range and about 0.8 nsec near the high end of the supply voltage range. Throughout the voltage range the dead-time of the example circuit varies about 1.2 nsec compared to 3.8 nsec for the conventional circuit. In addition, because the deadtime can be set so low at the low end of the supply voltage range, the switching circuit can operate much more efficiently compared to a conventional switching circuit.

Figure 3:
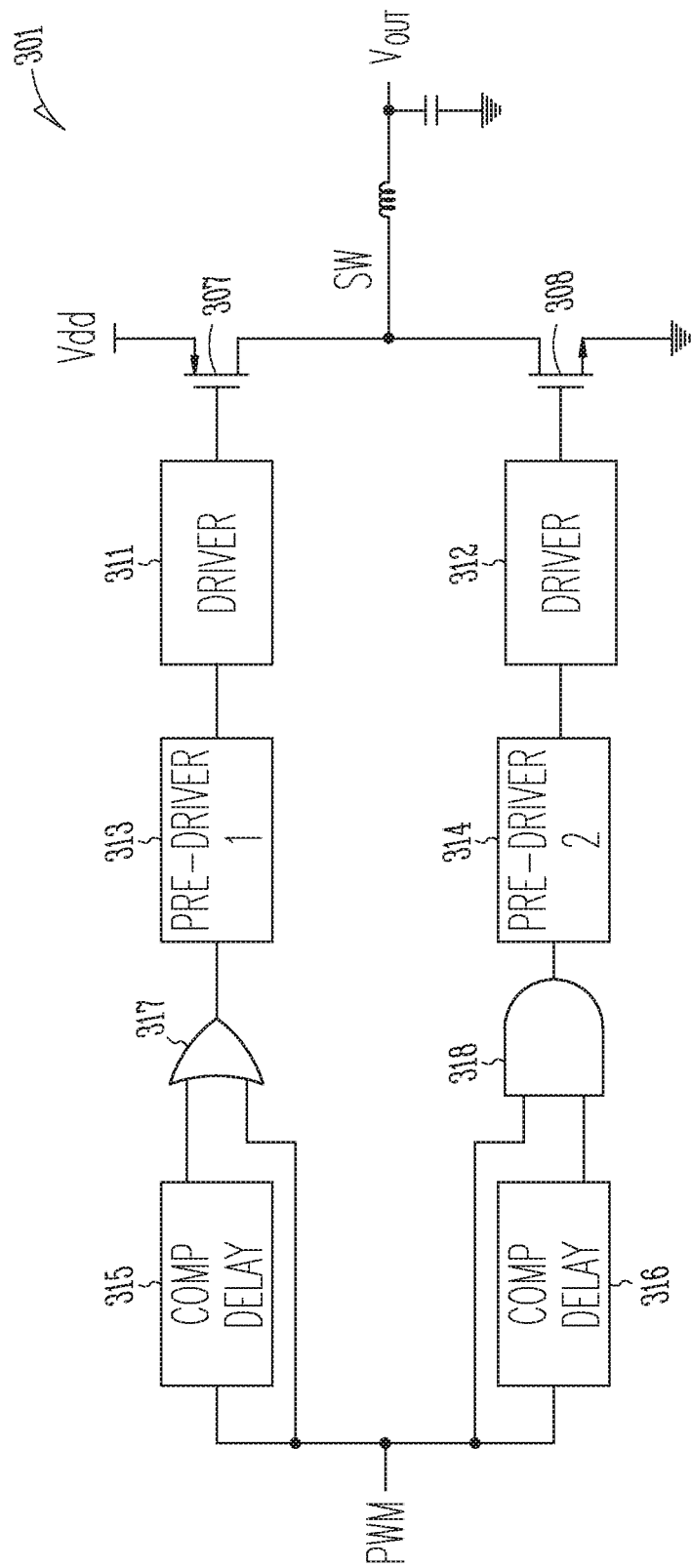
FIG. 3 illustrates generally an example circuit including compensation for both switches of a switching circuit.

FIG. 3 illustrates generally an example switching circuit 301 including compensation for both switches 307, 308 of the switching circuit 301. FIG. 3 includes the first switch 307, the second switch 308, the first driver 311, the second driver 312, the first pre-driver 313, the second pre-driver 314, the first compensation delay circuit 315, a second compensation delay circuit 316, and logic 317, 318 to bypass each compensation delay circuit 315, 316. Although a switching circuit can include other supply voltage compensation, the present subject matter is drawn to supply voltage compensation for a dead-time preceding one of the switches entering a low-impedance state. As such, it is generally not desired that a compensation circuit affect the transition of the corresponding switch as the switch exits the low-impedance state. Accordingly, the example of FIG. 3 includes logic 317, 318 to bypass each compensation delay circuit as the corresponding switch exits the low-impedance state and enters the high-impedance state. The bypass logic 317, 318 can include an OR-gate 317 in one of the signal paths of the first and second switches 307, 308 and an AND-gate 318 in the signal path of the other switch. In the illustrated example, the OR-gate 317 is place in the signal path of the first, n-channel switch 307 and the AND-gate 318 is placed in the signal path of the second, p-channel switch 308. The illustrated arrangement allows a transition of the input signal (PWM) from a high logic level to a low logic level to bypass the first compensation delay circuit 315 and a transition of the input signal (PWM) from a low logic level to a high logic level to bypass the second compensation delay circuit 316.

Figure 4A:
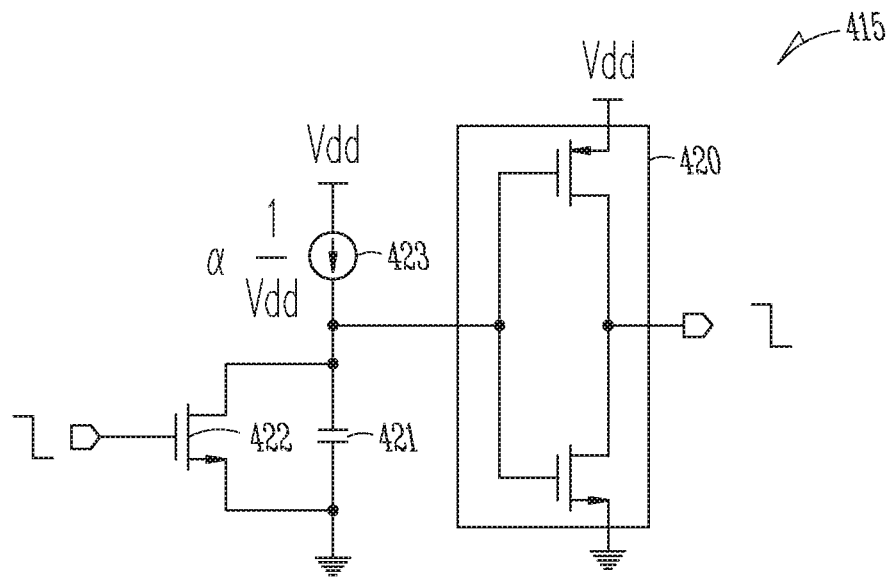
FIG. 4A illustrates an example first compensation delay circuit.
Figure 4B:
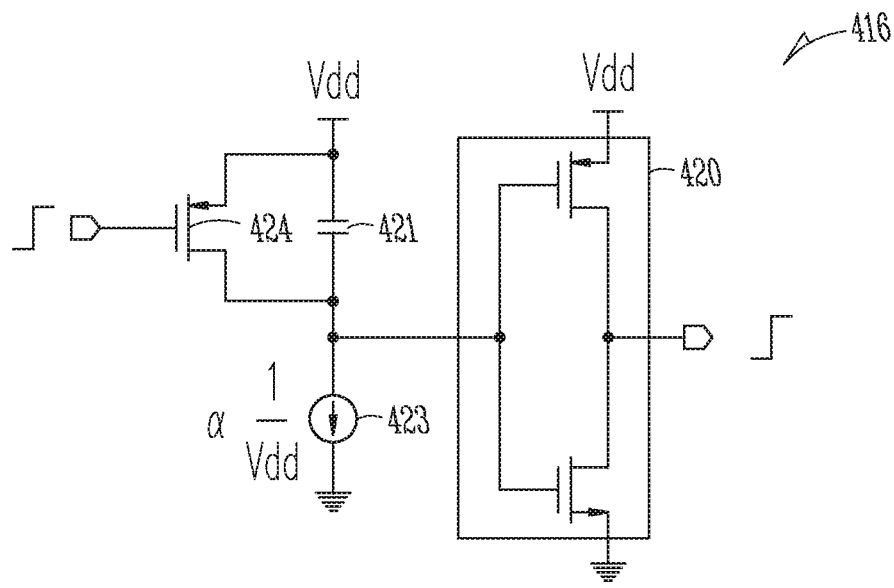
FIG. 4B illustrates an example of a second compensation delay circuit.

FIG. 4A illustrates an example first compensation delay circuit 415 and FIG. 4B illustrates an example of a second compensation delay circuit 416. Each compensation delay circuit 415, 416 can include an inverter 420, a delay capacitor 421, an input bypass transistor 422, 424, and a compensation current source 423. The compensation current source 423 can provide current that can vary inversely with a variation of the supply voltage (Vdd). The compensation current source 423 can operate exchange charge with the delay capacitor 421, and the inverter 420 can drive the output of the compensation delay circuit 416, 415 based on a voltage across the delay capacitor 421. In certain examples, the delay ($D_{COMP}$) of the compensation delay circuit 415, 416 depends on the provided by the compensation current source 423. For example, as the current, or charge exchange capacity, of the compensation current source 423 decreases, the delay can increase as less charge is transferred to or from a plate of the delay capacitor 423. In certain examples, the compensation current source 423 is configured have a decreasing charge exchange capacity as the supply voltage (Vdd) increases. As such, the delay of the example compensation delay circuits 415, 416 can increase as the supply voltage (Vdd) increases. For the example compensation delay circuits 415, 416, the delay ($D_{COMP}$) can be given by:

$$D_{COMP} = \frac{(Vdd - vth)C}{I_{cap}} = \frac{\frac{Vdd}{2}C}{\frac{k}{Vdd}} = \frac{Vdd^2 C}{2k},$$

where, Vdd is the supply voltage, "vth" is the threshold voltage of the inverter transistors, $I_{cap}$ is the current of the delay capacitor 421, C is the capacitance of the delay capacitor 421, and k is a coefficient of the compensation current source 423 and is defined below. Thus, each example compensation delay circuit 415, 416 can provide a delay ($D_{COMP}$) that increases as the supply voltage (Vdd) increases. In the present examples, the change in the delay ($D_{COMP}$) changes as a square of the change in the supply voltage (Vdd). It is understood that other compensation delay circuits that provide an increasing delay with an increasing supply voltage are possible without departing from the scope of the present subject matter.

Figure 5A:
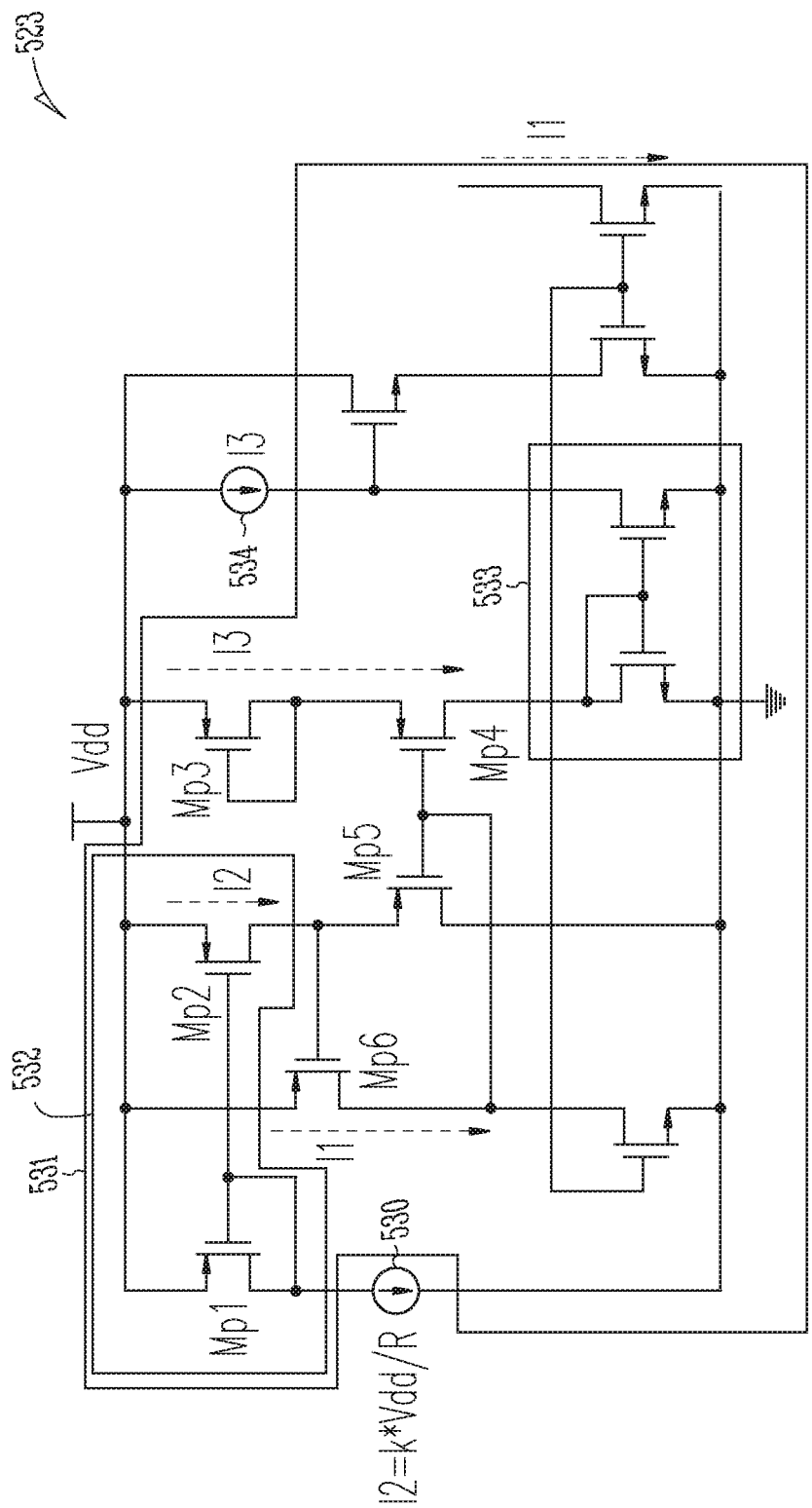
FIG. 5A illustrates generally an example compensation current source for the compensation delay circuits of FIGS. 4A and 4B.

FIG. 5A illustrates generally an example compensation current source 523 for the supply-voltage compensation delay circuits 415, 416 of FIGS. 4A and 4B. In certain examples, the compensation current source 523 can include a first current source 530, a network of transistors 531 including two current mirrors 532, 533, and a second current source 534. The first current source 530 can be configured to provide a current (I2) proportional to the supply voltage (Vdd). The second current source 534 can be configured to provide a constant current (I3) independent of the supply voltage (Vdd) in the range of interest, such as the range of supply voltages specified for operation of the switching circuit. In general, the network of transistors 531 of the compensation current source 523 attempt to maintain the sum of the gate-to-source voltages (Vgs) of the M5 and M6 equal to the sum of the gate-to-source voltages (Vgs) of M3 and M4. At that point of operation, I3 is equal the multiplication of I1 with I2. As discussed above, I2 is the current of the first current source 530 as mirrored by the first current mirror 532 comprising M1 and M2. I3 is the substantially constant current of the second current source 534 as mirrored by the second current mirror 533. As such, I1 is the current sourced or sunk by the example compensation current source 523. Since, $$I3^2 = I2 \cdot I1,$$

I1 can be given by, $$I1 = \frac{I3^2}{I2}.$$

Figure 5B:
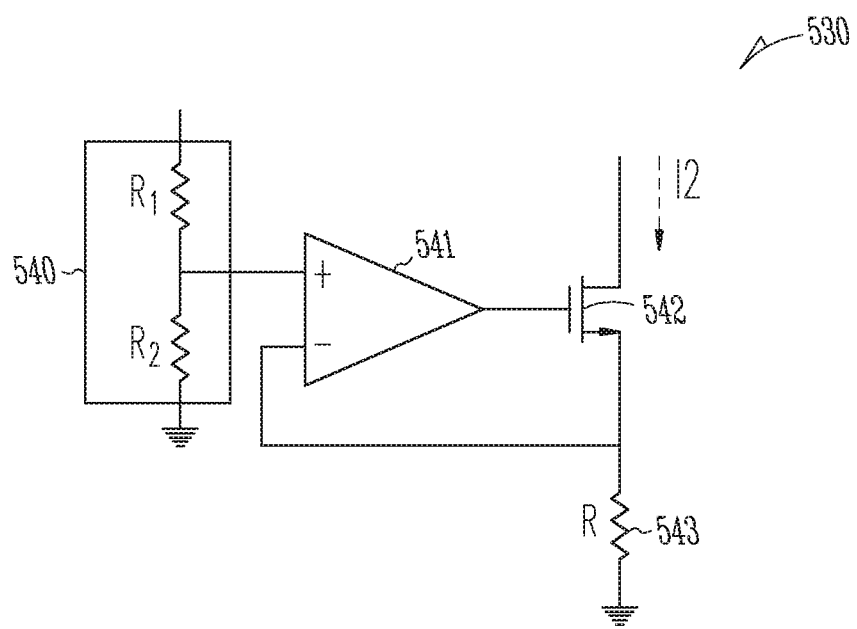
FIG. 5B illustrates an example current source circuit for the first current source of FIG. 5A.

In certain examples, each of the transistors M3, M4, M5, and M6 can operate in the sub-threshold region to support the functions described above. FIG. 5B illustrates an example circuit for the first current source 530 of FIG. 5A. The first current source 530 can include a voltage divider 540, an amplifier 541, a transistor 542, and an output resistor (R) 543. The amplifier 541 can be arranged as a voltage follower such that the voltage provided by the voltage divider 540 can vary with the supply voltage (Vdd). In turn the current (I2) of the transistor 542 can be modulated proportional to the supply voltage (Vdd) such that I2 can be given by, $$I2 = \frac{Vdd}{R} \frac{R2}{R1 + R2},$$

where Vdd is the supply voltage, R is the resistance of the output resistor 543, R1 and R2 are the respective resistances of the voltage divider 540 and, $$k = \frac{R2}{R1 + R2}.$$

As such, $$I1 = \frac{I3^2 R}{k Vdd}.$$

In summary, the circuits of FIGS. 4A, 4B, 5A, 5B can be implemented to provide a compensation delay such that the deadtime of a switching circuit can be set to a minimum value at a low supply voltage value and the deadtime can be set to remain close to that minimum value as the supply voltage varies within an acceptable operating range of the switching circuit, such as the supply voltage range shown in the example of FIG. 2.

Figure 6:
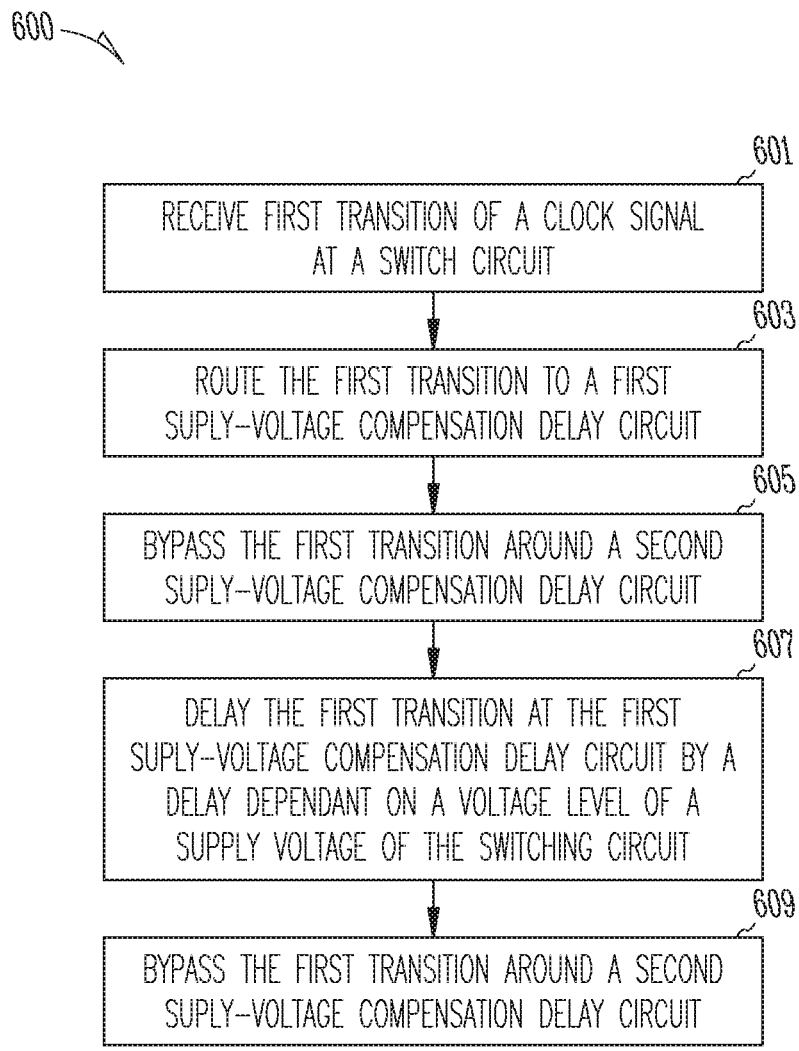
FIG. 6 illustrate generally a flowchart of an example method 600 for operating a switching circuit according to the present subject matter.

FIG. 6 illustrate generally a flowchart of an example method 600 for operating a switching circuit according to the present subject matter. At 601, a first transition of a clock signal can be received at the switching circuit. The transition can be intended to place one of a first or second switch of the switching circuit into a low-impedance state. In certain examples, the switching circuit can include the first switch coupled in series with the second switch between supply rails of the switching circuit. At 603, the transition can be routed to a first supply-voltage compensation delay circuit coupled to a pre-driver of the respective switch of the switching circuit. At 605, the transition can be routed to bypass a supply-voltage compensation delay circuit coupled to the other switch of the switching circuit. At 607, the transition can be delayed by the first supply-voltage compensation delay circuit by a first delay dependent on a voltage level of the supply voltage of the switching circuit. At 609, the first delay can change in-kind with, or in the same direction as, a change in voltage level of the supply voltage.

Various Notes & Examples

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, the terms "including" and "comprising" are open-ended, that is, a system, device, article, composition, formulation, or process that includes elements in addition to those listed after such a term are still deemed to fall within the scope of subject matter discussed. Moreover, such as may appear in a claim, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of a claim. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. The following aspects are hereby incorporated into the Detailed Description as examples or embodiments, with each aspect standing on its own as a separate embodiment, and it is contemplated that such embodiments can be combined with each other in various combinations or permutations.

What is claimed is:

1. A switch circuit having a first switch configured to couple to a first supply rail, a second switch configured to couple to second supply rail and a switch node coupling the first switch in series with the second switch, the switch circuit comprising:
    a control circuit configured to alternately switch the first switch and the second switch into and out of a low impedance state, and to prevent the first switch and the second switch from shorting the first supply rail with the second supply rail using a dead-time before a transition to the low impedance state of each of the first and second switches, and
    wherein the control circuit includes a delay element, the delay element including a compensation delay circuit configured to change in-kind with a change of a voltage difference between the first supply rail and the second supply rail, and to limit a range of the dead-time over a range of the voltage difference.

2. The switch circuit of claim 1, wherein the compensation delay circuit includes a first compensation circuit associated with the first switch and a second compensation circuit associated with the second switch.

3. The switch circuit of claim 2, wherein the compensation delay circuit includes a first gate configured to bypass the first compensation circuit in response to a first command signal configured to transition the first switch from the low impedance state.

4. The switch circuit of claim 3, wherein the compensation delay circuit includes a second gate configured to bypass the second compensation circuit in response to a first command signal configured to transition the second switch from the low impedance state.

5. The switch circuit of claim 2, wherein the control circuit includes a first driver for a control node of the first switch, wherein the first driver includes a first delay configured to change inversely with a change of the voltage difference within the range.

6. The switch circuit of claim 5, wherein the first compensation circuit includes:
    a compensation current source;
    a compensation inverter having an input coupled to the compensation current source;
    wherein an output of the compensation inverter is coupled to an input of the first driver; and
    wherein the compensation current source is configured to provide current at a monotonically decreasing function with respect to the voltage difference.

7. The switch circuit of claim 6, wherein the first compensation circuit further includes:
    a compensation capacitor coupled in series with the compensation current source at an input of the compensation inverter and between the first supply rail and the second supply rail; and
    a compensation transistor configured to receive a command signal for the first transistor, the compensation transistor coupled across the compensation capacitor.

8. A switch circuit having a first switch configured to couple to a first supply rail, a second switch configured to couple to second supply rail and a switch node coupling the first switch in series with the second switch, the switch circuit comprising:
    a control circuit configured to receive a binary control signal, to alternately switch the first switch and the second switch into and out of a low impedance state in response to the binary control signal, and to prevent the first switch and the second switch from shorting the first supply rail with the second supply rail using a dead-time before a transition to the low impedance state of each of the first and second switches; and wherein the control circuit includes a means to delay propagation of the control signal as a monotonically increasing function of a voltage difference between the first supply rail and the second supply rail, and to limit a range of the dead-time over a range of the voltage difference.

9. The switch circuit of claim 8, wherein the means to delay propagation of the control signal includes:
first means to provide a first delay of a control signal transition configured to place the first switch in a low-impedance state and to not to provide the first delay of a control signal transition configured to place the first switch in a high-impedance state.

10. The switch circuit of claim 9, wherein the means to delay propagation of the control signal includes:
second means to provide a second delay of a control signal transition to place the second switch in a low-impedance state without providing the second delay of a control signal transition configured to place the second switch in a high-impedance state.

11. The switch circuit of claim 10, wherein each of the first and second means includes:
a capacitor; and
a first current source configured to source or sink charge via the capacitor to provide the respective first and second delay; and
wherein the charge source or sink capability of the current source is inversely proportional to the supply voltage over the range.

12. The switch circuit of claim 11, wherein the first current source includes:
a second current source configured to provide a second current (I2) configured to change with a corresponding change in the supply voltage within the range;
a third current configured to supply a third current (I3) independent of the supply voltage within the range;
a transistor network configured to adjust the charge source or sink capability of the first current source such that $$I3^2 = I2 \cdot I1;$$ and wherein I1 is a current sourced or sunk by the first current source.

13. A method of operating a switch circuit having a first switch coupled to a first supply rail, and a second switch coupled in series with the first switch to a second supply rail, the method comprising:
receiving a plurality of transitions of a clock signal at the switch circuit;
delaying propagation of a first transition of the plurality of transitions to a pre-driver of the first switch by a first interval in response to a first voltage difference between the first supply rail and the second supply rail; and
delaying propagation of a second transition of the plurality of transitions to the pre-driver of the first switch by a second interval in response to a second voltage difference between the first supply rail and the second supply rail;
wherein, the first interval is less than the second interval in response to the first voltage difference being less than the second voltage difference.

14. The method of claim 13, including not providing a predetermined propagation delay of the first transition to a pre-driver of the second switch.

15. The method of claim 14, wherein receiving the first transition includes receiving the clock signal transiting from a first state to a second state, wherein the second state is configured to place the first switch in a low-impedance state.

16. The method of claim 13, including not providing a predetermined propagation delay of the second transition to pre-driver of the second switch.

17. The method of claim 16, including bypassing a third transition of the plurality of transitions around the first supply-voltage compensation delay circuit coupled to the pre-driver of the first switch.

18. The method of claim 16, including routing the third transition to a second supply-voltage compensation delay circuit coupled to the pre-driver of the second switch.

19. The method of claim 18, including delaying propagation of the third transition by a first interval in response to the first voltage difference between the first supply rail and the second supply rail; and
delaying propagation of a fourth transition by a second interval in response to the second voltage difference between the first supply rail and the second supply rail;
wherein, when the first voltage difference is less than the second voltage difference, the first interval is less than the second interval.

20. The method of claim 18, wherein receiving the third transition includes receiving a clock signal transiting from a first state to a second state, wherein the second state is configured to place the second switch in a low-impedance state.

21. A circuit comprising:
a first power switch having a control node, a first switch node, and a second switch node, the first switch node coupled to a first supply rail;
a second power switch having a control node, a first switch node and a second switch node, the first switch node of the second power switch coupled to the second switch node of the first power switch, and the second switch node of the second power switchcoupled to a second supply rail;
a first drive circuit having an output coupled to the control node of the first power switch;
a second drive circuit having an output coupled to the control node of the second power switch; and
a first compensation circuit configured to receive a command signal and to pass a first representation of the command signal to an input of the first drive circuit, the first compensation circuit having a first delay configured to change in-kind with a change in a supply voltage defined by a voltage difference across the first supply rail and the second supply rail.

22. The circuit of claim 21, including a first logical gate having a first input coupled to the output of the first compensation circuit, a second input configured to receive the command signal, and an output coupled to the control node of the first power switch, the logical gate configured to:
in response to a first transition of the command signal, to pass the first representation of the command signal to the input of the first drive circuit; and
in response to a second transition of the command signal, pass the command signal by the first compensation circuit.

23. The circuit of claim 22, including a second compensation circuit configured to receive the command signal and to pass a second representation of the command signal to an input of the second drive circuit, the second compensation circuit having a second delay configured to change in-kind with a change in the supply voltage.

24. The circuit of claim 21, including a second logical gate having a first input coupled to the output of the second compensation circuit, a second input configured to receive the command signal, and an output coupled to the control node of the second power switch, the second logical gate configured to:
  in response to the first transition of the command signal, pass the command signal by the second compensation circuit; and
  in response to the second transition of the command signal, to pass the second representation of the command signal to the input of the second drive circuit.

25. The circuit of claim 24, wherein the first logical gate is an AND-gate and the second logical gate is an OR-gate.

\* \* \* \* \*